(12) United States Patent
Ward et al.

(10) Patent No.: US 9,693,044 B2
(45) Date of Patent: Jun. 27, 2017

(54) METHOD FOR CONSTRUCTING A STEREOSCOPIC LIGHT RECYCLING DEVICE

(71) Applicant: Lightspeed Design, Inc., Bellevue, WA (US)

(72) Inventors: Chris Ward, Kirkland, WA (US); Robert Mueller, Kenmore, WA (US); Kirk Melby, Bothell, WA (US)

(73) Assignee: Lightspeed Design, Inc., Bellevue, WA (US)

( * ) Notice: Subject to any disclaimer, the term of this patent is extended or adjusted under 35 U.S.C. 154(b) by 0 days.

(21) Appl. No.: 15/348,955

(22) Filed: Nov. 10, 2016

(65) Prior Publication Data

US 2017/0064293 A1    Mar. 2, 2017

Related U.S. Application Data

(63) Continuation of application No. 14/160,509, filed on Jan. 21, 2014, now Pat. No. 9,494,805.

(Continued)

(51) Int. Cl.
*H04N 13/04* (2006.01)
*G02B 27/22* (2006.01)
(Continued)

(52) U.S. Cl.
CPC .......... *H04N 13/0434* (2013.01); *G02B 5/08* (2013.01); *G02B 7/182* (2013.01); *G02B 13/16* (2013.01);
(Continued)

(58) Field of Classification Search
CPC .......... H04N 13/0434; H04N 13/0438; H04N 13/0459; H04N 2213/001; G02B 5/08; G02B 7/182; G02B 13/16; G02B 27/2264; G02B 27/26; G02B 27/283; G03B 21/28; G03B 21/54; G03B 35/16; G03B 35/26

(Continued)

(56) References Cited

U.S. PATENT DOCUMENTS 6,404,464 B1 *    6/2002    Faris ..................... B82Y 15/00
                                                      252/299.01
7,040,766 B2 *    5/2006    Hibi ....................... G03B 21/28
                                                      348/E9.027

(Continued)

*Primary Examiner* — Bumsuk Won
*Assistant Examiner* — Grant Gagnon
(74) *Attorney, Agent, or Firm* — Patrick J. S. Inouye; Krista A. Wittman

(57) ABSTRACT

A method for constructing a stereoscopic device is provided. A chassis with front and back openings and that forms a housing framing the front and back openings is constructed. A beam splitter constructed of substantially orthogonally polarizing material faces the back opening and is captively held to the chassis. A single phase shifting optic having a reflective surface coated by a phase shifting film on which the divergent image light is received is placed at an angle non-perpendicular to the divergent image light, such that the phase shifting optic is facing toward the front opening and is substantially parallel to the polarizing material of the beam splitter. The beam splitter and phase shifting optic are in optical alignment with each other within the chassis. A modulator sized to cover at least a portion of the front opening is positioned in front of the front opening.

22 Claims, 14 Drawing Sheets

Related U.S. Application Data

(60) Provisional application No. 61/805,457, filed on Mar. 26, 2013.

(51) Int. Cl.
  *G02B 13/16* (2006.01)
  *G02B 5/08* (2006.01)
  *G02B 7/182* (2006.01)
  *G02B 27/26* (2006.01)
  *G02B 27/28* (2006.01)
  *G03B 21/28* (2006.01)
  *G03B 21/54* (2006.01)
  *G03B 35/16* (2006.01)
  *G03B 35/26* (2006.01)

(52) U.S. Cl.
  CPC ......... *G02B 27/2264* (2013.01); *G02B 27/26* (2013.01); *G02B 27/283* (2013.01); *G03B 21/28* (2013.01); *G03B 21/54* (2013.01); *G03B 35/16* (2013.01); *G03B 35/26* (2013.01); *H04N 13/0438* (2013.01); *H04N 13/0459* (2013.01); *H04N 2213/001* (2013.01)

(58) Field of Classification Search
  USPC ........................................................ 359/465
  See application file for complete search history.

(56) References Cited

U.S. PATENT DOCUMENTS

| | | | | |
|---|---|---|---|---|
| 8,696,133 | B2* | 4/2014 | Imaoka | G02B 27/26 349/5 |
| 2008/0231953 | A1* | 9/2008 | Young | G02B 27/286 359/489.08 |
| 2009/0041449 | A1* | 2/2009 | Kim | G03B 35/26 396/324 |
| 2010/0157251 | A1* | 6/2010 | Sakata | G02B 27/285 353/20 |
| 2010/0302510 | A1* | 12/2010 | Sakata | F21V 7/0025 353/20 |
| 2011/0242506 | A1* | 10/2011 | Uchiyama | G03B 21/14 353/98 |
| 2012/0257168 | A1* | 10/2012 | Ishimatsu | G02B 5/3058 353/20 |
| 2013/0023307 | A1* | 1/2013 | Zimmerman | G03B 21/28 455/557 |
| 2013/0113788 | A1* | 5/2013 | Schuck | G02B 27/48 345/419 |
| 2013/0126079 | A1* | 5/2013 | Lee | C08G 18/6229 156/247 |
| 2015/0109539 | A1* | 4/2015 | Li | G02B 27/26 349/9 |

* cited by examiner

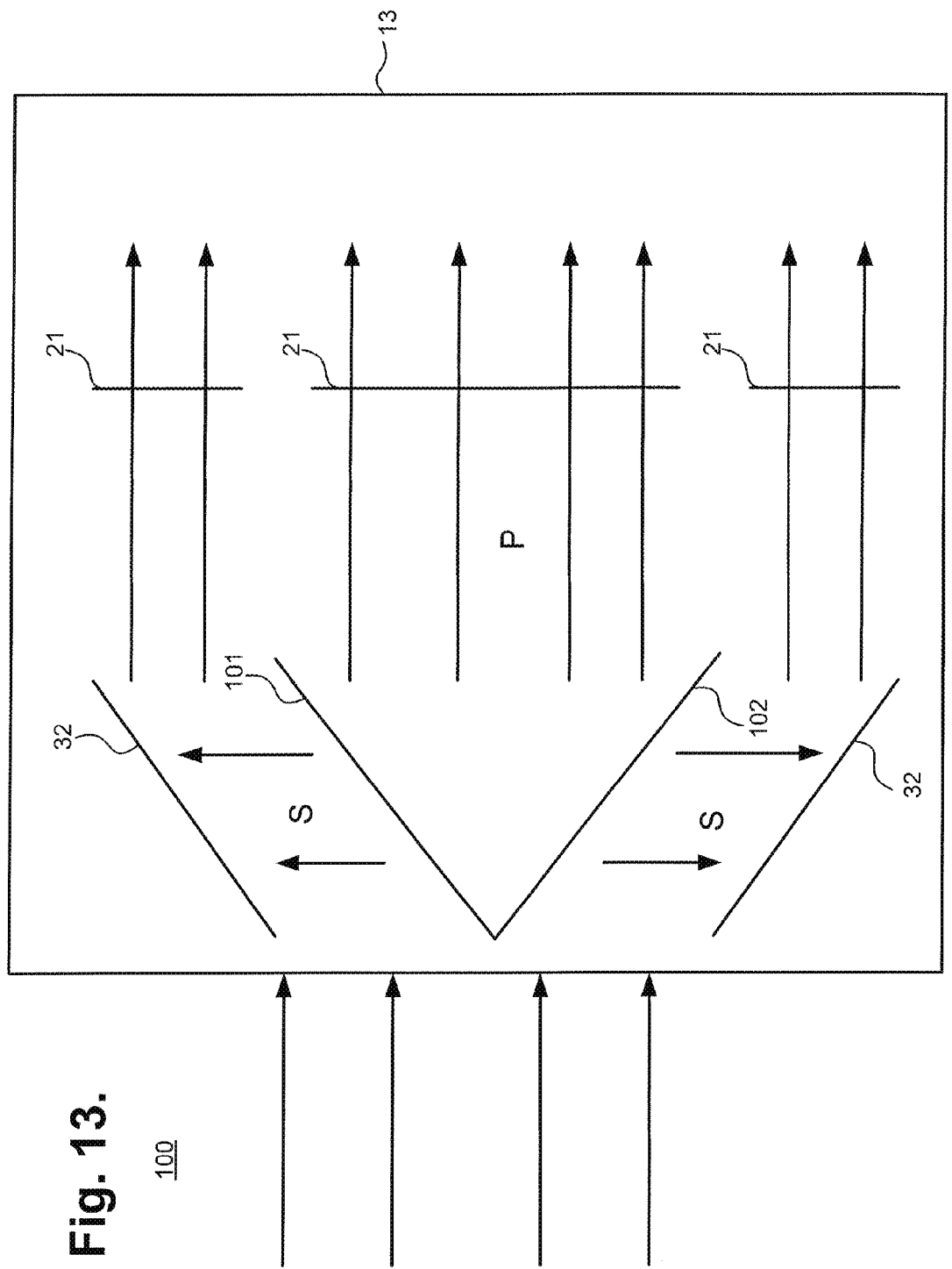

METHOD FOR CONSTRUCTING A STEREOSCOPIC LIGHT RECYCLING DEVICE

CROSS-REFERENCE TO RELATED APPLICATION

This application is a continuation of U.S. patent application Ser. No. 14/160,509, filed Jan. 21, 2014, pending, which claims priority under 35 U.S.C. §119(e) to U.S. Provisional Patent Application, Ser. No. 61/805,457, filed Mar. 26, 2013, the priority dates of which are claimed and the disclosures of which are incorporated by reference.

FIELD

The invention relates in general to stereoscopic imaging, and in particular, to a method for constructing a stereoscopic light recycling device.

BACKGROUND

Since the mid-1980's, three-dimensional (3D) films have greatly increased in popularity worldwide. 3D films enhance an illusion of depth perception, such that images in the film can appear to a viewer to extend in and out of a projection screen. Stereoscopic imaging devices are commonly used for playing 3D films, and in the past, have utilized dual projection systems with passive polarization. However, current stereoscopic imaging devices now utilize a single digital projection source combined with an active polarizing modulation device. For example, the single digital projection source can alternately project right and left eye frames. The active polarizing modulation device then alternately polarizes each frame using linear or circular polarization. Viewers wear glasses with oppositely polarized lenses to experience three-dimensional features that appear to extend in and out of a polarization-preserving projection screen.

However, while offering substantial quality benefits in comparison with dual projection systems, stereoscopic imaging devices with a single projection source emit images with substantially reduced brightness. Specifically, the light from a projection source must be linearly pre-polarized for the polarization modulating device to function. Other factors that contribute to the loss of light include the duty cycle of the projected left and right frames, dark time, white point calibration, reflective and transmissive surface losses, and polarization inefficiencies.

Attempts to increase image brightness of current stereoscopic imaging devices have been made. For instance, U.S. Pat. No. 7,857,455, to Cowan, discloses a multiple path stereoscopic projection system to enhance brightness of stereoscopic images perceived by a viewer. The system includes a polarizing splitting element, a reflector, a retarder, and a polarization modulator. Light received by the stereoscopic projection system is split into a primary path and a secondary path. The reflector and retarder are typically located in the secondary path, while the polarization modulator is located within at least the first path. The stereoscopic projection system includes multiple parts with exposed-to-air surfaces that can be difficult to clean, and which can reduce the quality and brightness of the images and the lifespan of the system if left uncleaned. Therefore, a stereoscopic imaging device with fewer parts and exposed surfaces is beneficial to maintain image quality and increase the life of the device.

Further, U.S. Pat. No. 7,905,602, to Schuck, discloses a polarization conversion system that is located in a randomly-polarized light path emitted by a projector. The polarization conversion system includes a polarizing beam splitter, a polarization rotating element, a reflecting element, and a polarization switch. The beam splitter separates p- and s-polarized light. The p-polarized light is directed on a first path to the polarization switch, while the s-polarized light is directed on a second path, passed through the polarization rotating element and transformed to p-polarized light before reaching the reflecting element which directs the now p-polarized light to the polarization switch. Additionally, the conversion system includes a telephoto lens pair to control magnification, distortion, and imaging properties of the first light path. The numerous parts and exposed-to-air surfaces of the polarization conversion system can be difficult to clean and expensive to maintain. However, without cleaning and maintenance, the quality and brightness of the images deteriorates and the life span of the conversion system is reduced.

Currently, a polarization conversion system with fewer parts and exposed surfaces is needed to increase quality and brightness of stereoscopic images while decreasing maintenance and increasing the life of the system.

SUMMARY

A stereoscopic light recycling device increases the brightness of images projected from a single projector. The light recycling device includes a beam splitter and phase shifting optic, which are both housed within a chassis, and a polarizing modulator. The chassis is placed in front of the projector, while the polarizing modulator is placed in front of the chassis, opposite the projector.

One embodiment provides a method for constructing a stereoscopic device. A chassis with front and back openings and that forms a housing framing the front and back openings is constructed. The back opening is open to divergent image light. A beam splitter constructed of substantially orthogonally polarizing material faces the back opening and is captively held to the chassis. A single phase shifting optic having a reflective surface coated by a phase shifting film on which the divergent image light is received is placed at an angle non-perpendicular to the divergent image light, such that the phase shifting optic is facing toward the front opening and is substantially parallel to the polarizing material of the beam splitter. The beam splitter and phase shifting optic are in optical alignment with each other within the chassis. A modulator sized to cover at least a portion of the front opening is positioned in front of the front opening.

Still other embodiments and applications will become readily apparent to those skilled in the art from the following detailed description, wherein are described embodiments by way of illustrating the best mode contemplated. As will be realized, other and different embodiments are possible and their several details are capable of modifications in various obvious respects, all without departing from the spirit and the scope. Accordingly, the drawings and detailed description are to be regarded as illustrative in nature and not as restrictive.

BRIEF DESCRIPTION OF THE DRAWINGS

FIG. 13 is a block diagram showing light transmitted through the recycling device of FIG. 1 with two beam splitters and two phase shifting optics.

DETAILED DESCRIPTION

Traditionally, a stereoscopic display system required two separate projectors, which each projected a slightly different perspective of a common image. However, conventional stereoscopic display systems now use a single projector with a polarizing modulation device to alternate between both perspectives. The alternating perspectives from a single projector eliminate alignment and other asymmetry problems, including geometry, color, white-balance, brightness, and timing that are associated with the traditional display system, making the conventional systems far more comfortable to view, easier to maintain, and much more desirable. A disadvantage of the conventional systems versus the traditional systems is a loss in image brightness, not only due to the loss of one of the projectors, but also from factors including the duty cycle of projected left and right frames, pre-polarization of incoming light, dark time, white point calibration, reflective and transmissive surface losses, and polarization inefficiencies.

Conventional systems that attempt to increase the brightness of stereoscopic images from a single projector include many optical components with multiple surfaces exposed to air that must be thoroughly cleaned and maintained to receive the benefits of the increased brightness. Stereoscopic display systems are typically operated in commercial theater environments which include food preparation particulates in the air, especially popcorn oils. This fine, sticky particulate coats optical surfaces and subsequently draws other dust and particulates, and is a commonly reported issue in the industry. The cleaning can be difficult and time consuming, but if left undone, can decrease the image quality and reduce a lifespan of the device.

Figure 1:
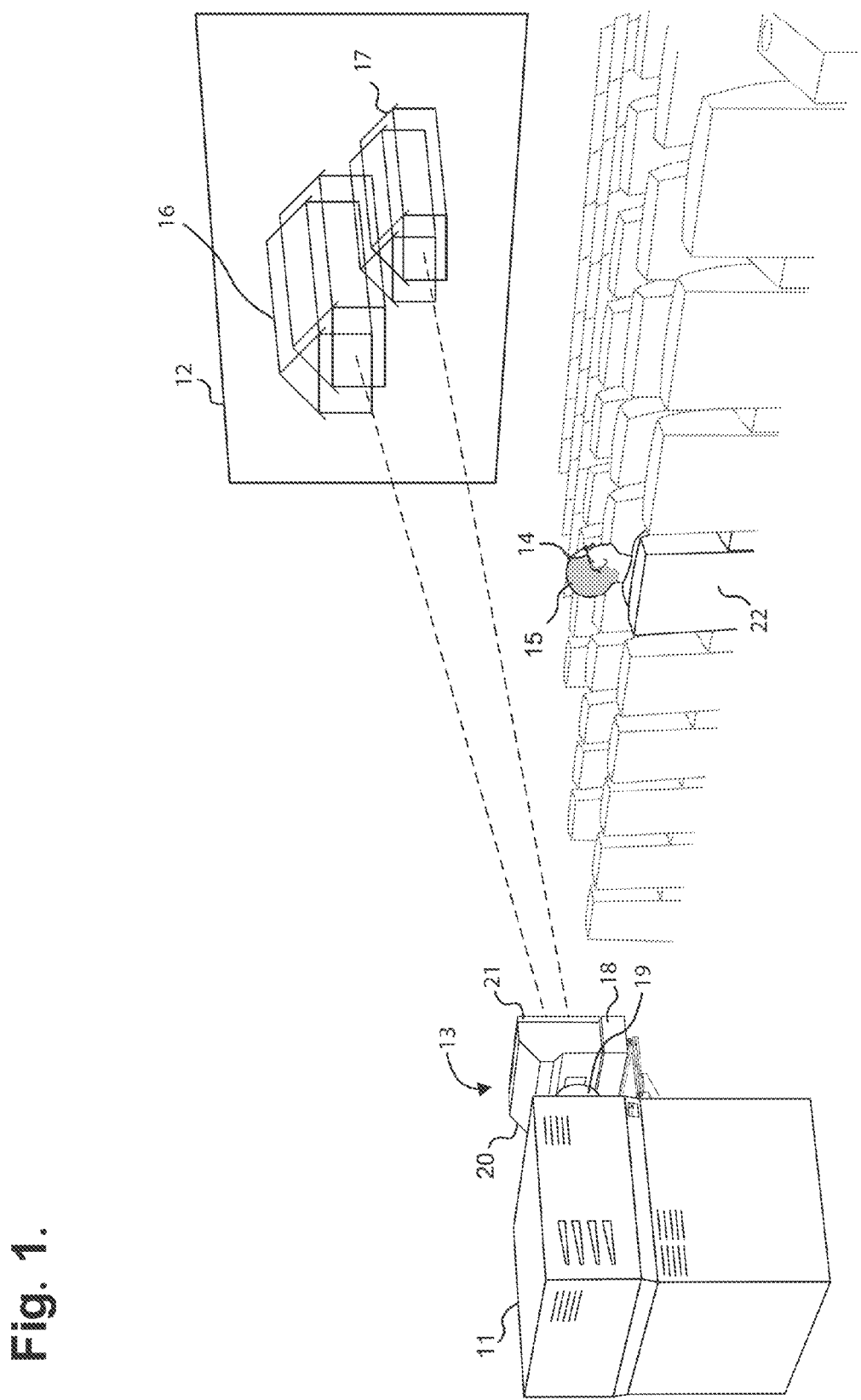
FIG. 1 is a block diagram showing an environment for a stereoscopic light recycling device.

The stereoscopic light recycling device can be used with a projector to increase brightness of 3D images projected by the projector, while including only minimal components and exposed-to-air surfaces to reduce maintenance and maintain image quality, brightness, and device life. FIG. 1 is a block diagram showing an environment for a stereoscopic light recycling device 13. A projector 11 is positioned near a back of a room, while a polarization-preserving projection screen 12 is placed at a front of the room opposite the projector 11. The projector 11 can be a three-chip projector that splits light received into red, green, and blue colors, which are separately directed to three digital micromirror device chips and subsequently recombined. Other types of projectors are possible. However, at a minimum, the projector should emit partially-polarized light. In one embodiment, the polarized portion should be substantially aligned linearly along a vertical axis, with the stereoscopic recycling device optimized for this orientation. In a further embodiment, an optic can be used with a projector that does not emit partially-polarized light to create the partially-polarized light. In a still further embodiment the projector can emit unpolarized light.

Figure 6:
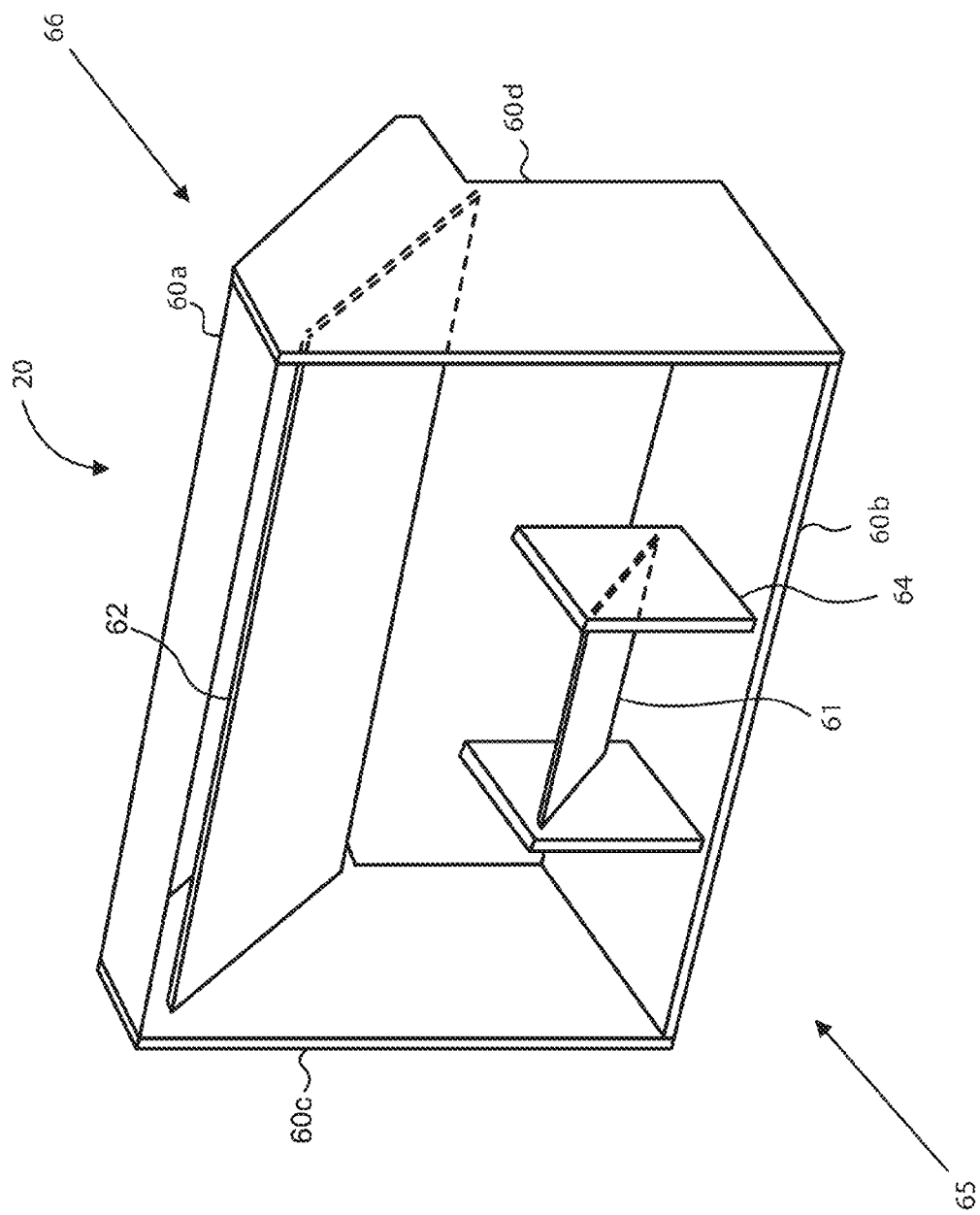
FIG. 6 is a block diagram showing an alternate light converter for use in the recycling device of FIG. 1
Figure 8:
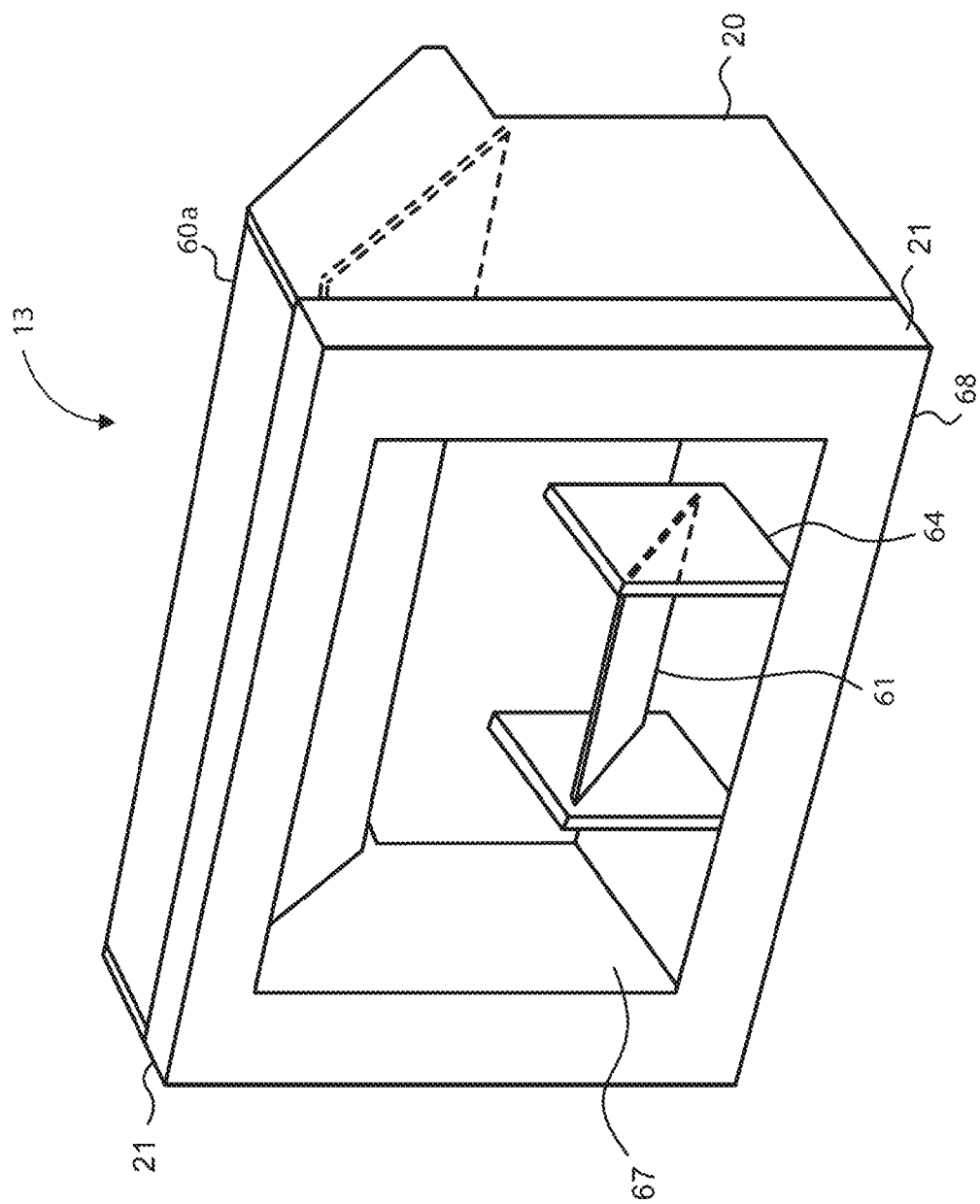
FIG. 8 is a block diagram showing a front view of the recycling device of FIG. 1.

The stereoscopic recycling device 13 can include a light converter 20 and a polarizing modulator 21, which are described below in further detail with respect to FIGS. 2, 6, and 8. The light converter 20 includes a beam splitter and phase shifting optic, and can be positioned directly in front of a lens 19 of the projector 11. The polarizing modulator 21 is positioned on a front side of the light converter opposite the projector. In one embodiment, the polarizing modulator 21 is affixed to the light converter 20. However, in a different embodiment, the light converter 20 and polarizing modulator 21 are two separate components. Both the light converter 20 and polarizing modulator 21 can be affixed to a device mount 18 that allows the components of the recycling device 13 to move closer towards or away from the lens, to the left or right of the lens, and above or below the lens 19. The mount device 18 can be affixed to a stand for the projector or to the projector itself.

The light converter 20 receives stereoscopic image light from the projector lens 19 and splits the light into two separate light beams that each provide a separate, but similar, stereoscopic image that is displayed on the polarization-preserving projection screen 12. Specifically, the two stereoscopic images produced will be slightly different due to a difference in path length that the respective light beams follow. Thus, stereoscopic images 16 and 17 must be substantially aligned on the screen to generate a quality 3D picture that can be comfortably viewed by an audience. In one embodiment, the images should be aligned within one to two pixels or about 0.1% of the overall image. Other thresholds for image alignment are possible.

A viewer 15 wearing stereoscopic glasses 14 sees a single 3D image projected on the screen. However, the single projector source 11 provides alternating (time multiplexed) left and right eye views of the image. While the stereoscopic recycling device orthogonally polarizes each view, the polarization-preserving screen 12 maintains light polarization that reflects back to the viewer, and the glasses provide a separate image to each eye of the viewer. For instance, passive glasses include different polarization lenses for the right and left eyes so that one image enters the viewer's right eye, while the other image enters the viewer's left eye. The viewer's brain is then able to combine the input of the right and left eyes to form a single 3D image with depth.

The stereoscopic recycling device 13 includes a light converter 20 to generate and direct to the screen a second, similar instance of a conventional system's time-multiplexed left and right stereoscopic images emitted from the projector, thus increasing the total brightness of the stereoscopic images reaching the viewer. FIG. 2 is a block diagram showing a light converter 20 for use in the recycling device of FIG. 1. The light converter 20 includes a chassis having enclosed top 30a, bottom 30b, left 30c, and right 30d sides, while a front 35 and back 36 of the chassis 30a-d can remain open or can be covered. In one example, the open front side of the light converter can be covered by the polarizing modulator, while the open back side can be enclosed by a back cover that can include at least one opening or aperture to allow light to enter the chassis. The back cover of the chassis is further described below with reference to FIG. 5. In a further embodiment, the front and back sides can remain open while components within the chassis, such as the beam splitter 31 and phase shifting optic 32 are each enclosed by a protective housing made from anti-reflection coated glass or other light-transmissive optical materials to prevent dust and dirt from accumulating. Other materials for enclosing the beam splitter and phase shifting optic are possible, including plastic, metal, carbon fiber or wood designed to hold anti-reflection coated glass or other light-transmissive optical materials and create a dust-free space allowing light passage. The protective housing can be conformably shaped around each of the beam splitter 31 and phase shifting optic 32, or alternatively, the protective housing can have a different shape, such as a square or rectangle.

The chassis can be made from metal, heavy plastic, carbon fiber, wood, or other types of material. In one embodiment, the chassis can form a rectangular shape with the left 30c and right sides 30d longer than the top 30a and bottom 30b sides. The bottom 30b side can be perpendicularly affixed to the left 30c and right 30d sides, while the top 30a side is affixed to the left 30c and right 30d sides at an angle facing the open front side of the chassis. However, in further embodiments, other shapes of the chassis are possible, including square, cylindrical, spherical, or polygon shapes. For example, the chassis can have a polygon shape, where a slope extends from the top side, out and along the back of the left and right sides to accommodate the phase shifting optic.

The chassis houses the beam splitter 31 and the phase shifting optic 32. The beam splitter 31 can be positioned on a bottom side 30b of the chassis at an angle with an input side facing the opening in the back side. In one embodiment, two support members 34 are perpendicularly affixed to an upper surface of the bottom 30b side such that the support members 34 are also housed by the chassis. In a further embodiment, the support members 34 can be affixed to the inner left and right sides of the chassis. The two support members 34 are positioned to face one another at a distance that is dependent on a size of the beam splitter 31. For example, the longer the beam splitter 31, the further the distance between the support members 34. In one embodiment, the beam splitter 31 has a rectangular shape with dimensions of 7.3 inches long and 4.4 inches tall. However, other sizes and shapes of the beam splitter and the support members are possible, including a circular beam splitter and a cylindrical support member. The shorter sides of the beam splitter can be affixed to the support members directly or connected via mounts affixed to the support members 34. The angle of the beam splitter can be a predetermined fixed angle, can be based on placement of the phase shifting optic 32, or can be made adjustable by affixing the beam splitter to one or more adjustable support members. Examples of adjustable support members can include a kinematic mount with 2-axis angle adjustment such as pitch and roll, or bar and clamp holders attached to a post which can be rotated within a post holder affixed to the chassis. Other examples are possible. In a further embodiment, the beam splitter, if large enough, can be affixed to the left and right sides of the chassis directly or via fixed or adjustable mounts.

The beam splitter 31 can be a wire grid polarizing beam splitter that receives light from the projector lens and splits the light into two separate substantially orthogonally polarized pathways of light. One light path is passed through the beam splitter along an original path of the light received from the lens, while the other path is reflected toward the phase shifting optic 32.

Other types of beam splitters are possible, including but not limited to various types of cube beam splitters, including a two-prism cube beam splitter. For example, the beam splitter can be a four-prism cube beam splitter that can be used with a reflector to create two equal path lengths of the light beams generated by the light converter as further described below with reference to FIG. 12. In a further embodiment multiple beam splitters can be used as further described below with reference to FIG. 13.

The phase shifting optic 32 is positioned at an angle above the beam splitter 31 and faces the front opening of the chassis, in an opposite direction of the beam splitter. The phase shifting optic 32 can be affixed to the top surface via screws 33 that can be used to adjust the phase shifting optic, as further described below with reference to FIG. 4A. Positioning of the phase shifting optic 32 and beam splitter 31 should be in optical alignment, which can be dependent on the surface of the phase shifting optic and a distance between the projector and screen, as described infra.

Figure 2:
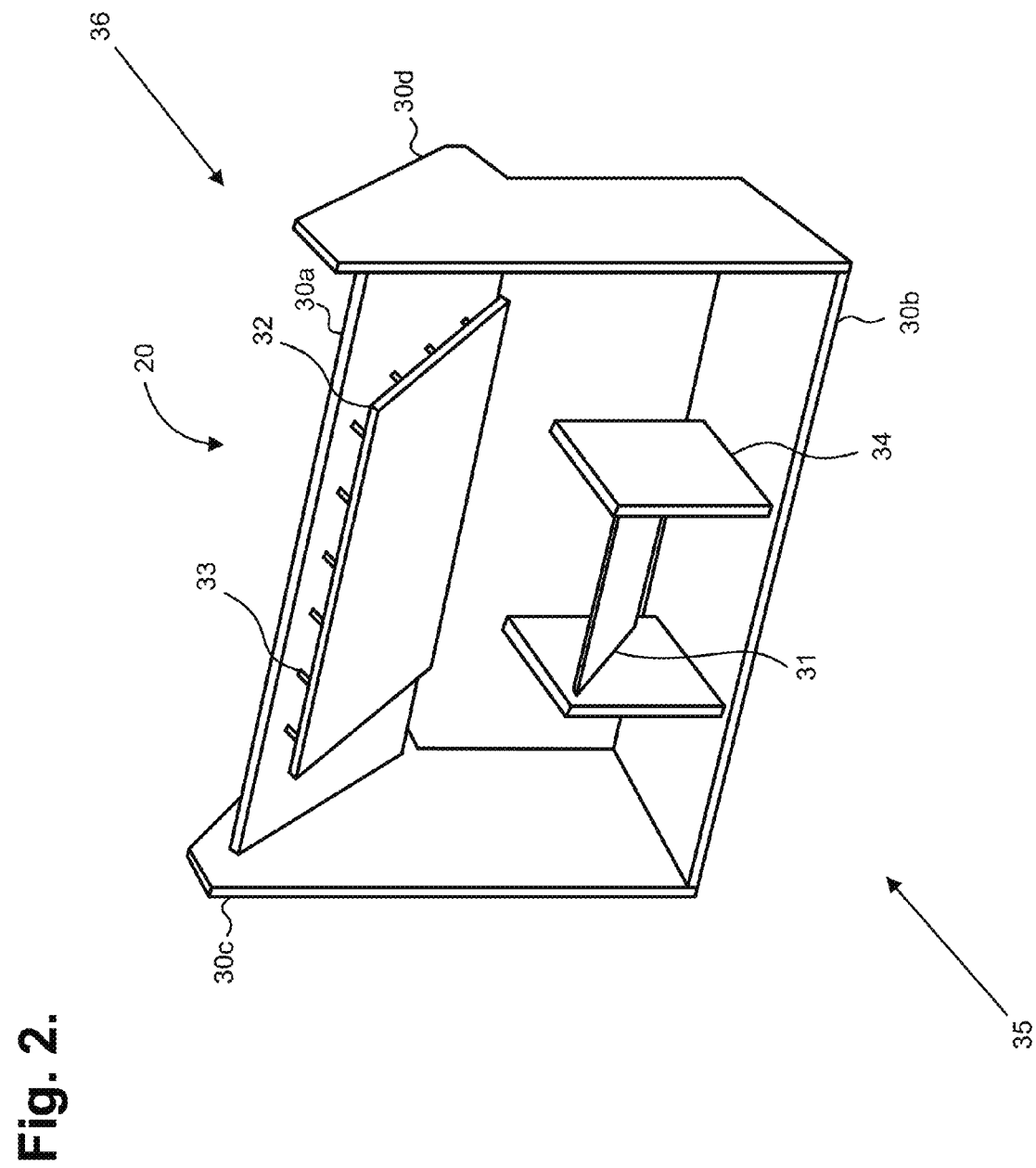
FIG. 2 is a block diagram showing, by way of example, a light converter for use in the recycling device of FIG. 1.
Figure 3A:
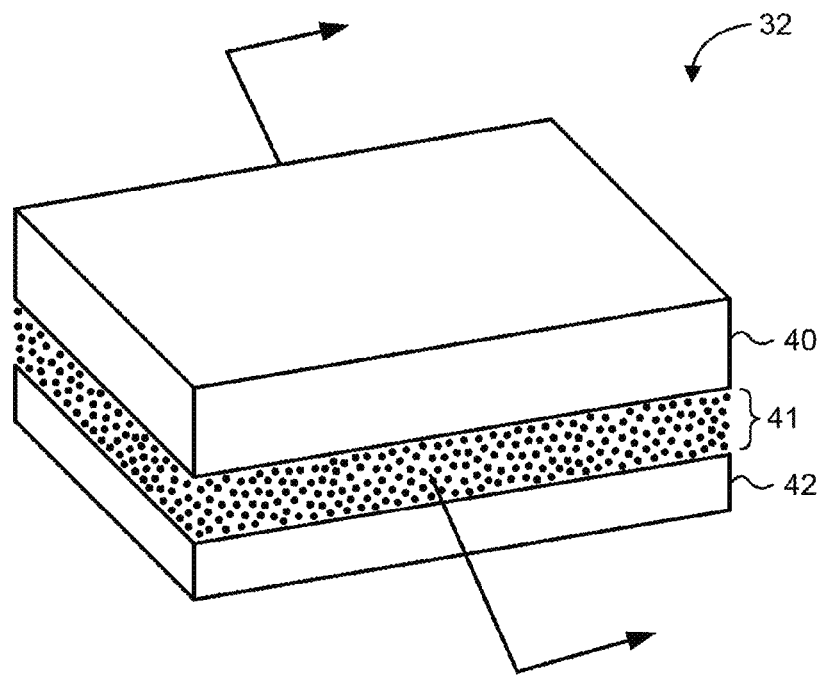
FIG. 3A is a block diagram showing the phase shifting optic of FIG. 2.

FIG. 3A is a block diagram showing, by way of example, the phase shifting optic 32 of FIG. 2. Components of the phase shifting optic are not drawn to scale and are only provided as an example. The phase shifting optic 32 can be made from a polarization-preserving reflective surface 40 and at least one layer of phase shifting film 42. The phase shifting film 42 can include quarter wave film, which is provided over at least a portion of the reflective surface and affixed via high-transmittance optical adhesive 41. Other types of adhesive substances can be used to affix the phase shifting film 42 to the reflective surface 40. In a further embodiment, the phase shifting optic 32 can be made from a polarization-preserving reflective surface 40 directly coated with a phase shifting material not requiring adhesive substances. In all cases, the phase shifting optic 32 functions as a single optical element with a reduced number of exposed faces to decrease required maintenance and increase device life, as well as increase quality and brightness of stereoscopic images.

Figure 3B:
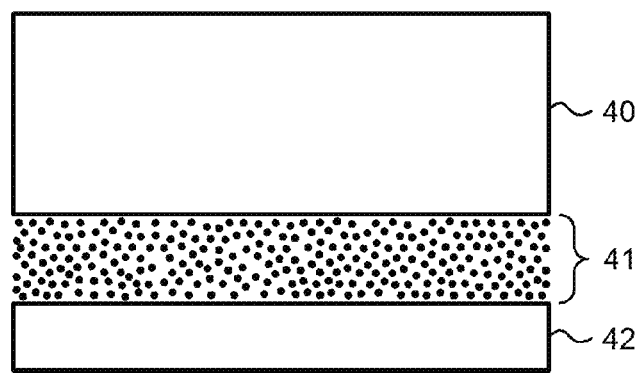
FIG. 3B is a cross-sectional view of the phase shifting optic of FIG. 2.

When positioned in the chassis, the reflective layer 40 of the phase shifting optic 32 is positioned closer to the top side of the chassis, while the phase shifting film 42 is positioned closer to the beam splitter. FIG. 3B is a cross-sectional view of the phase shifting optic 32 of FIG. 2. The figure is merely provided as an example and the components are not drawn to scale. Optical adhesive 41 can be provided over the reflective surface 40 and covered by the phase shifting film 42.

The size of the phase shifting optic 32 can be, in one embodiment, larger than the beam splitter. For example, dimensions of the phase shifting optic 32 can be 11 inches long by 7 inches tall. However, other sizes are possible, including using a phase shifting optic 32 with the same dimensions as the beam splitter. The size of the phase shifting optic 32 can be dependent on a total light path distance from a projector lens focal point to the phase shifting optic and a desired minimum width/distance throw ratio for the stereoscopic recycling device.

Further, when positioned within the chassis, the phase shifting optic 32 can have a surface shape that is adjustable or static, or a combination of adjustable and static capabilities as described in further detail below. An adjustable phase shifting optic can be adjusted while positioned within the chassis, while a static phase shifting optic's surface shape can include a free-form mirror that is generated prior to affixing the phase shifting optic to the chassis.

Figure 4A:
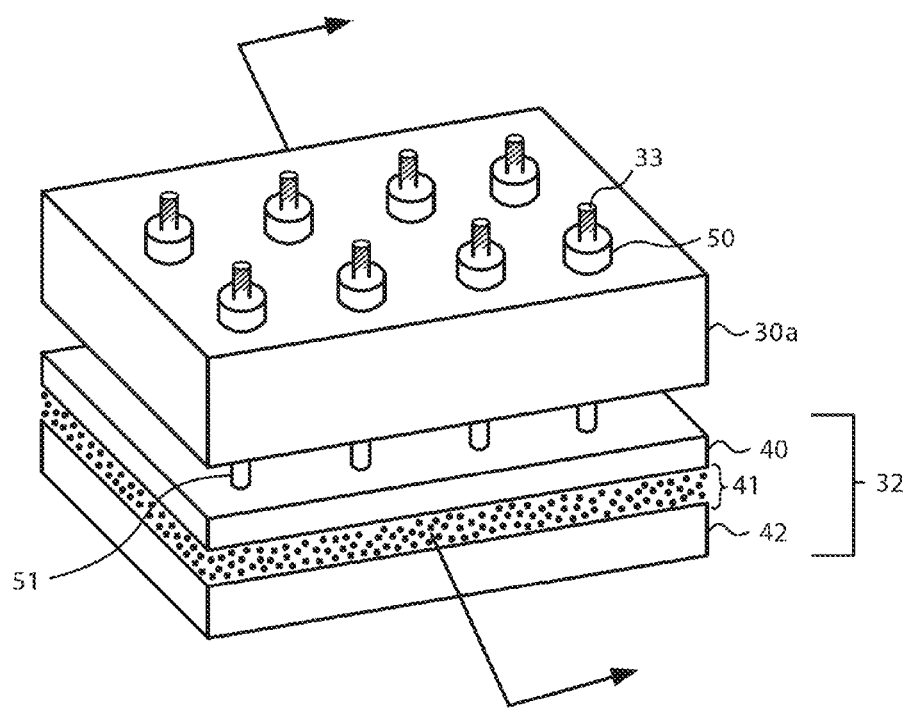
FIG. 4A is a block diagram showing an adjustable phase shifting optic of FIG. 2 moveably connected to the chassis.

FIG. 4A is a block diagram showing an adjustable phase shifting optic 32 of FIG. 2 moveably connected to the chassis. The phase shifting optic 32 is aligned with the top side of the chassis 30a. A plurality of screws 33 are each inserted through at least a portion of the phase shifting optic 32 at different locations and extend through the top side of the chassis until exiting on an outer surface of the top side. A nut 50 or other fastener is fastened to the screw on the outer top surface. Alternatively, a head of the screw 33 can be affixed to the phase shifting optic 32, extend through the top side of the chassis, and exit an outer surface of the top side. The phase shifting optic 32 and top side of the chassis can be located at a distance from one another, leaving a middle portion 51 of the screws exposed. The distance can be different across the phase shifting optic and is dependent upon adjustment necessary to align the images of the two light paths.

Figure 4B:
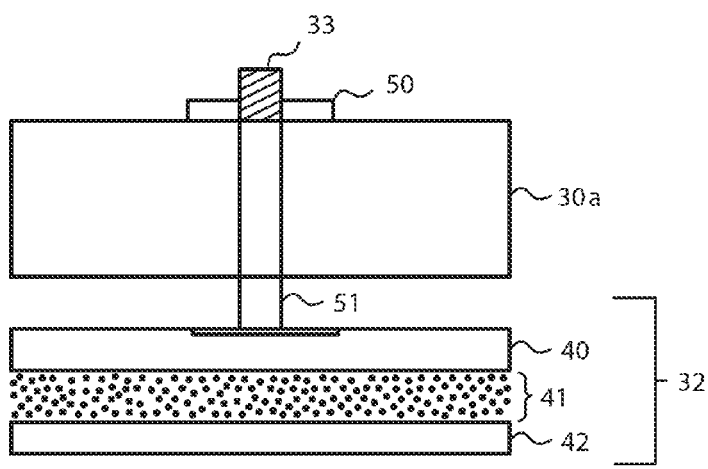
FIG. 4B is a cross-sectional view of the adjustable phase shifting optic of FIG. 2.

A user can manually adjust the phase shifting optic 32 through counter-clockwise adjustment of at least a portion of the screws, which pulls the phase shifting optic nearest the adjusted screws closer towards the top side of the chassis, and through clockwise adjustment of the screws, which pushes the phase shifting optic away from the top side. Thus, when the screws are adjusted counter-clockwise, the distances between the phase shifting optic and top side of the chassis are smaller than when the screws are adjusted clockwise. FIG. 4B is a cross-sectional view of the phase shifting optic of FIG. 2. A screw 33 is affixed to at least a portion of the phase shifting optic 32, which includes the reflective surface 40, optical adhesive 41, and phase shifting film 42. The top side of the chassis 30a is positioned a distance from the phase shifting optic 32 and the screws 33 extend from the phase shifting optic through the top side. A nut 50 or other fastener is used to hold the screw in place to lock the adjusted alignment. Other means for adjusting the phase shifting optic are possible. The screws can be adjustable via adjustment knobs using a screwdriver, a user's hand, or a machine that rotates screws. In one embodiment, the phase shifting optic 32 can be further globally adjusted by affixing the phase shifting optic to an adjustment device which can include a kinematic mount with 2-axis angle adjustments, such as pitch and roll.

Figure 5:
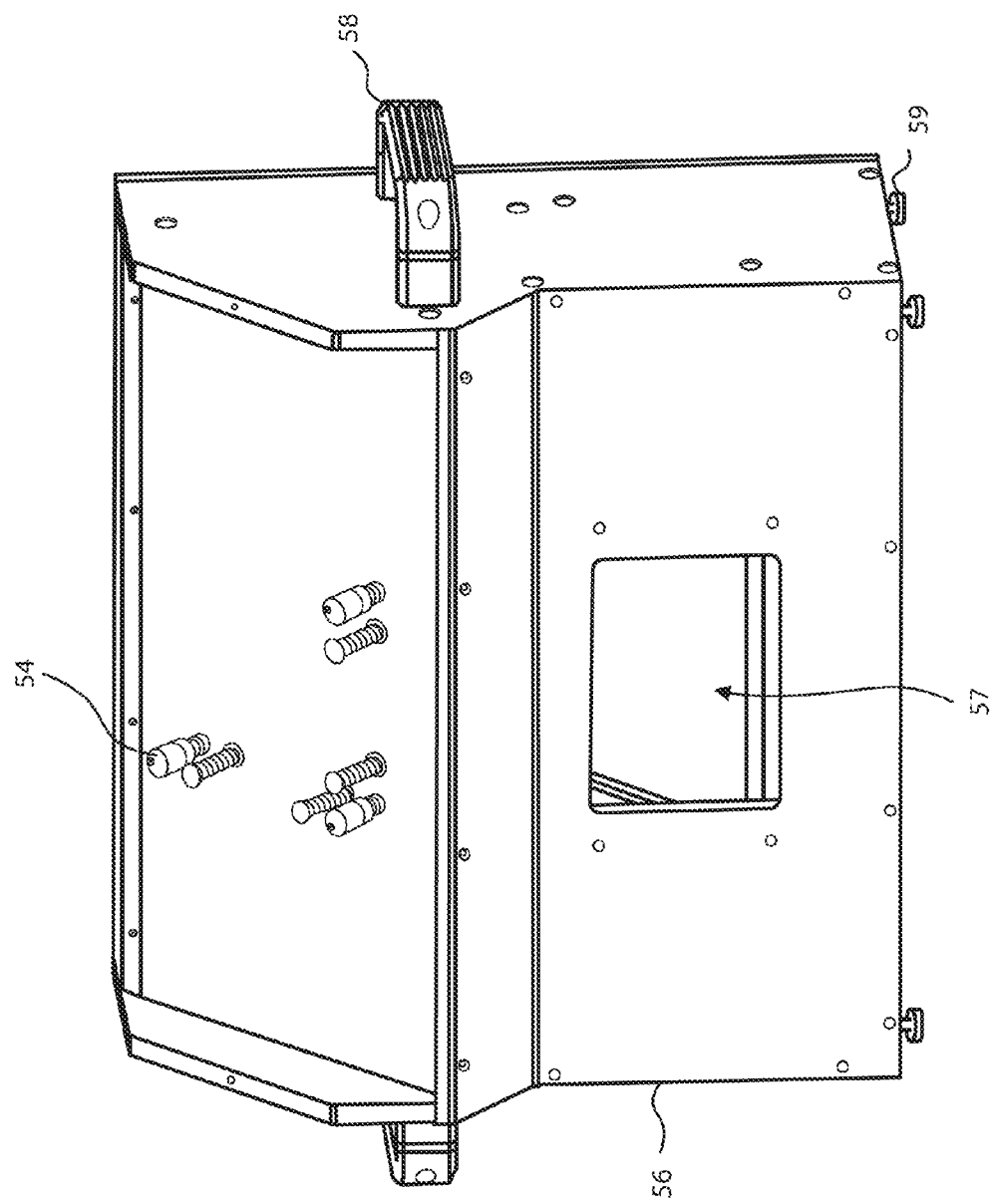
FIG. 5 is a block diagram showing a back side of the light converter of FIG. 2.

To ensure the components of the chassis remain clean, a cover can be affixed to the back of the chassis to minimize dust or other foreign objects from building on the beam splitter and phase shifting optic. FIG. 5 is a block diagram showing a back side of the light converter of FIG. 2. The cover 56 can be sized to enclose the back of the chassis and can be made from metal, heavy plastic, carbon fiber, wood, or other types of materials. The cover 56 can be affixed to the sides of the chassis via screws, nails, glue, or other type of adhesive. A cutout 57 can be formed within the back cover to allow light from the projector to enter the light converter. The cutout 57 can be covered by anti-reflective glass or other light-transmissive optical materials, or remain open.

Multiple adjustments 54 for an adjustment device affixed to the chassis can be presented through the cover 56. To assist in closely aligning the images from the two light paths, the adjustment device can include a kinematic mount with 2-axis angle adjustment such as pitch and roll that allows the phase shifting optic to be steered vertically and horizontally, and can further include z-axis translation. Alternatively, or in addition, the beam splitter can be mounted to an adjustment device to assist in directing the reflected path image for precise alignment.

As well, a handle 58 can be attached to each of the left and right sides of the chassis to allow users to easily move the light converter in front of and away from a projector. Additionally, adjustable feet 59 can be affixed to a bottom surface of the bottom side of the chassis and used to position the light converter in front of the projector.

While the light converter has been described above with an adjustable phase shifting optic, a static phase shifting optic with a uniform or non-uniform reflective surface shape that is formed prior to placement in the chassis can also be utilized. FIG. 6 is a block diagram showing an alternate light converter 20 with a static phase shifting optic for use in the recycling device of FIG. 1. A chassis having top 60a, bottom 60b, left 60c, and right 60d sides can house a beam splitter 61 and a static phase shifting optic 62. The sides of the chassis form front and back openings, which can be enclosed by front 65 and back 66 sides (not shown) each having an opening or aperture (not shown). The beam splitter 61 is positioned at an angle within the chassis with the input side facing the opening in the back side. The beam splitter 61 can be affixed to the chassis or support members 64 within the chassis, depending on a size of the beam splitter. For instance, when smaller than the distance between the left 60c and right 60d sides of the chassis, the beam splitter 61 can be affixed to the support members 64, which are perpendicularly affixed to the bottom side of the chassis. The support members 64 are spaced to accommodate the longest dimension of the beam splitter 61, while the shorter sides of the beam splitter 61 are affixed to the support members 64. Other sizes and shapes of the beam splitter and the support members are possible, including a circular beam splitter and a cylindrical support member.

The static phase shifting optic 62 is placed at an angle within the chassis above the beam splitter 61 and faces the opening in the front side. The angle of the phase shifting optic 62 should be in optical alignment with the beam splitter 62 to provide a clear sharp image by closely aligning the images from the two light paths. Positioning of the phase shifting optic 62 and beam splitter 61 can be dependent on the surface of the phase shifting optic and a distance between the projector and screen, as described infra.

A surface of the static phase shifting optic can have a uniform or non-uniform shape. The static phase shifting optic can include a free-form mirror and a phase shifting film. A non-uniform, non-rotationally symmetric surface shape for the free-form mirror is designed using computer ray-tracing simulations. A required surface is based on the mathematical description of a higher order xy-polynomial, and a physical surface can be manufactured using ultra-precision computer-controlled machining with tolerances in the sub-micron range. In one instance an inverted master mold is made of the required shape and glass thermal forming processes including compression molding and thermal slumping are used to economically create subsequent copies from the master mold.

As described above with reference to FIGS. 3A and 3B, the phase shifting film can be affixed to the free-form mirror using optical adhesive or other types of adhesive. The free-form mirror can have a non-uniform curvature whose shape is computer generated. The shape of the free-form mirror is dependent upon a distance between the projector and screen and the difference in distances between the two light paths within the light converter, and serves to align the images of the two light pathways on the screen. The static phase shifting optic can optionally be placed on one or more adjustment devices used to adjust angle and optionally position of the free-form mirror to assist in closely aligning the images from the two light paths.

Once generated, the surface of the free-form mirror may not be able to be significantly changed. If a significantly different reflective surface of the free-form mirror is required, a new mirror must be generated and installed. For instance, a particular free-form mirror may be used with the recycling device for a particular range of throw-ratios with respect to the projector and projection screen. A different phase shifting optic with a different free-form mirror may be used with the recycling device when a projector/screen throw-ratio relationship is located outside a valid throw-ratio range for the current free-form mirror. In one embodiment, a preformed set of phase shifting optics with different free-form mirrors for different ranges of valid throw ratio ranges can be generated and provided to a user with the light converter. Based on the distance of the projector from the screen and the size of the screen, the user can select an appropriate phase shifting optic and insert the phase shifting optic within the chassis.

The phase shifting optic can be mounted along an inner surface of the top side of the chassis or alternatively, the phase shifting optic can be mounted to the right and left sides of the chassis. Further, the phase shifting optic can be mounted to an adjustment device which is mounted to the chassis. When the phase shifting optic is affixed to the chassis sides, no top side is necessary. Regardless of being placed along the top side, mounted to the left and right sides, or mounted on an adjustment plate, the static phase shifting optic can be placed upon a mount, shelf, or other support mechanism attached to the chassis so that the static phase shifting optic can be easily changed should a different phase shifting optic be required to project images on a screen located further or closer to the projector. However, some free-form mirrors may be at least partially adjustable and can be deformed in real time as described above with reference to the adjustable phase shifting optic.

Figure 7:
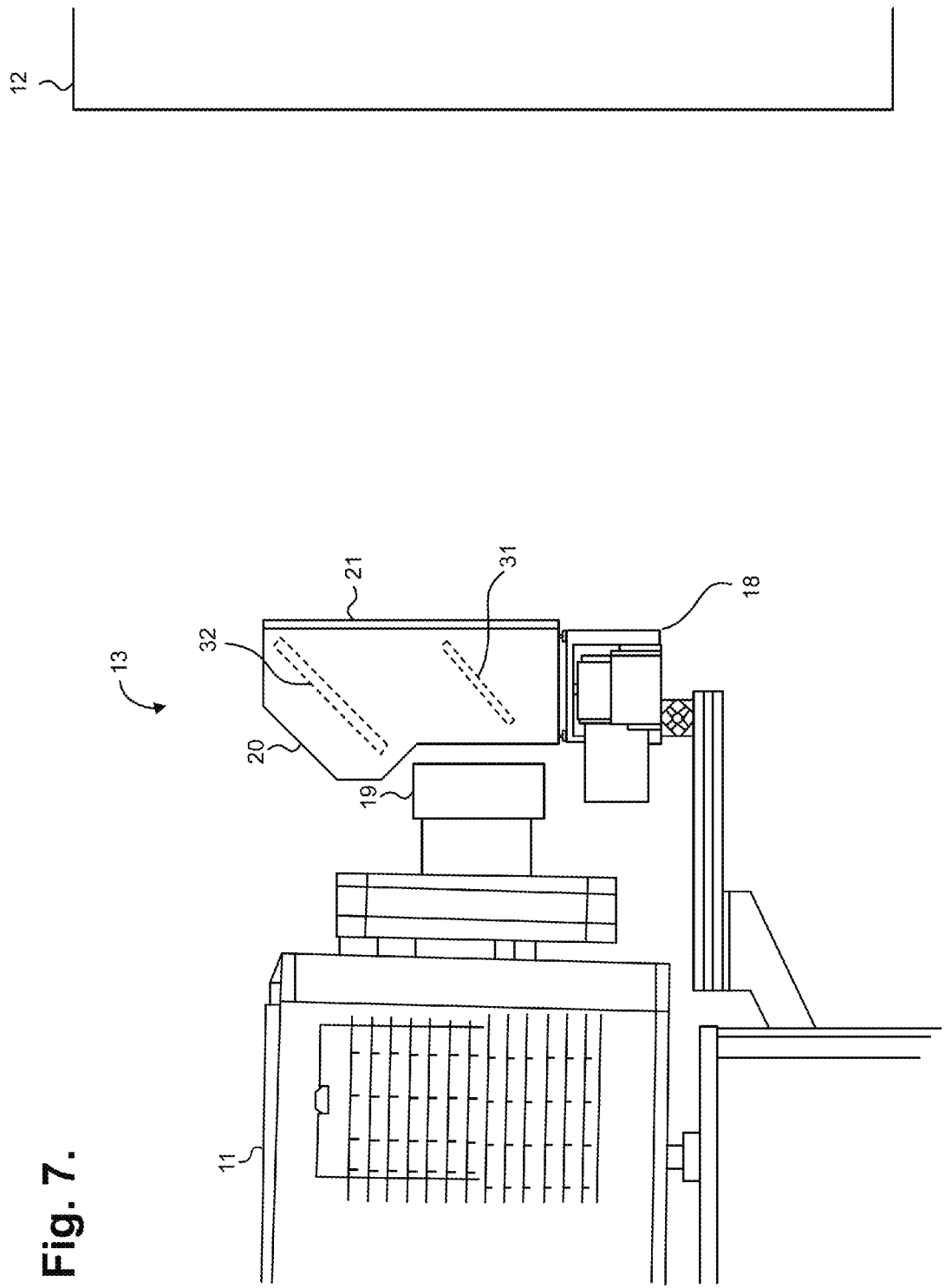
FIG. 7 is a block diagram showing a side view of the recycling device of FIG. 1.

In addition to the light converter, the recycling device includes a polarizing modulator. FIG. 7 is a block diagram showing a side view of the recycling device of FIG. 1. A light converter 20 is positioned in front of a lens 19 of a light projector 11 and can be affixed directly to the light projector, to a stand of the light projector, or to a stand, wall or shelf in front of the projector. The light converter 20 includes a beam splitter 31 which is positioned at an angle facing the lens and a phase shifting optic 32, which is located above the beam splitter 31 at an angle facing away from the lens. In a further embodiment, the phase shifting optic can be located below the beam splitter. The beam splitter 31 and phase shifting optic 32 are in optical alignment, as further described below with reference to FIG. 9.

A polarizing modulator 21 is placed in front of the light converter 20, opposite the light projector 11, and can be affixed to the light converter 20 or separately provided. In one embodiment, the recycling device can be affixed to a moveable mount 18 allowing the entire recycling device to be moved in or out of the projector's light path. Alternatively, only the polarizing modulator 21 can be affixed to a moveable mount, which moves the polarizing modulator back and forth, right and left, or up and down in relation to the lens of the projector allowing the polarizing modulator to be moved in or out of the projector's light path.

The polarizing modulator includes a frame, optical window, and control unit. FIG. 8 is a block diagram showing a front view of the recycling device 13 of FIG. 1. The polarizing modulator 21 is located on a front side of the light converter 20 and includes an optical window 67 surrounded by a frame 68. A control unit can be plugged into the frame 68 or into a panel (not shown) that is affixed to the frame. The polarizing modulator 21 receives light from the light converter 20 and electronically switches a polarization orientation of the light passing through the modulator by circularly polarizing left and right eye views in sync with a digital projector. In one embodiment, the optical window 67 of the polarizing modulator is large enough to receive light beams from both the beam splitter and phase shifting optic. In a further embodiment, multiple polarizing modulators can be used to receive light from one of the pathways.

Figure 9:
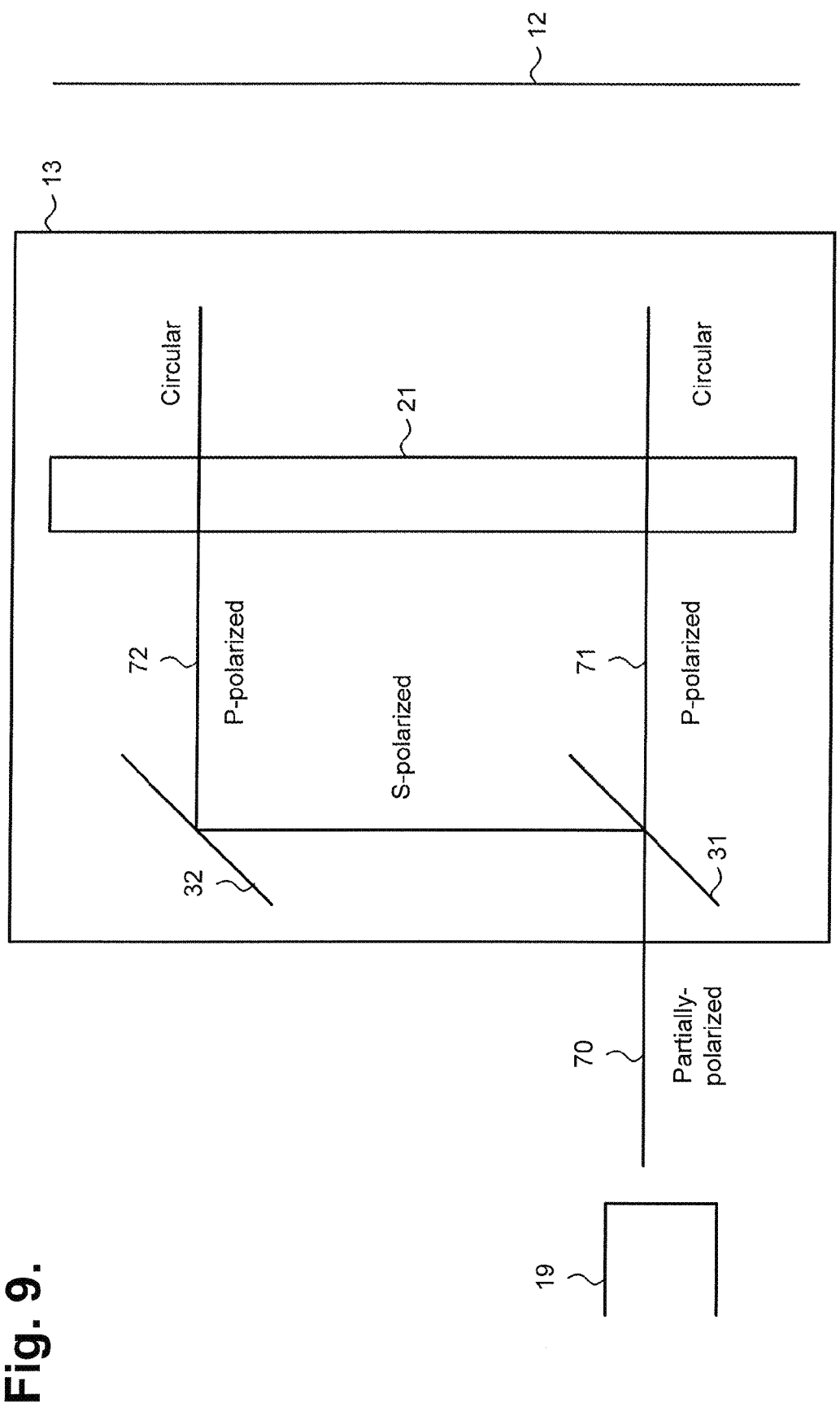
FIG. 9 is a block diagram showing, by way of example, light transmitted through the recycling device of FIG. 1.

Together, the light converter 20 and polarizing modulator 21 form the recycling device 13, which is placed in front of a projector 11 displaying alternating left and right stereoscopic images, and used to generate two common stereoscopic images that are displayed as substantially overlapping on a projection screen 12. FIG. 9 is a block diagram showing, by way of example, light 70 transmitted through the recycling device 13 of FIG. 1. A projector lens emits a single beam of partially polarized light 70 towards the beam splitter, which splits the light beam into two separate paths 71, 72. One path 71 includes p-polarized light that travels along the path of the original light beam 70 and passes through the beam splitter 31 to the polarizing modulator 21. The polarizing modulator 21 converts the p-polarized light 71 to alternating handedness of circular light in sync with the projected left and right images, which is projected upon the projection screen and a stereoscopic image is displayed.

Meanwhile the light of the other path 72 is directed away from the beam splitter 31 as s-polarized light. Specifically, the s-polarized light 72 is directed towards the phase shifting optic 32, which receives the s-polarized light 72, converts the s-polarized light to p-polarized light, and reflects the converted p-polarized light 72 along a path that is nearly parallel to the p-polarized light that passes through the beam splitter 31. The converted p-polarized light 72 is transmitted through the polarizing modulator 21, which converts the converted p-polarized light path 72 to alternating handedness of circular light in sync with the projected left and right images. The circular light is projected on the screen 12 where a further stereoscopic image is displayed in relation to the stereoscopic image of the original p-polarized light path 71.

The two stereoscopic images should be closely aligned to provide viewers with a sharp representation of the 3D image. In one embodiment, 99.9% of the images should be aligned. However, other values are possible. Both surface shape adjustment of the phase shifting optic, as well as positioning of the beam splitter and phase shifting optic are important in providing aligned images. For example, without surface shape adjustment of the phase shifting optic, a phase shifting optic aligned perfectly parallel to the beam splitter will cause the image directed to the screen by the phase shifting optic to be larger and higher on the projection screen relative to the image passed through the beam splitter. Simply steering the phase shifting optic without surface shape adjustment so that the center of each image converges on the projection screen, the top image will still be too large and keystone distortion will be introduced so that the bottom of the top image becomes wider and the sides are no longer parallel. Only adequate surface shape adjustment, either through adjustable-deformation or static free-form deformation of the phase shifting optic, in addition to correct optical alignment of both the beam splitter and the phase shifting optic, will result in magnification and keystone distortion being minimized with a substantial image overlap at the screen.

Once both alternating polarized stereoscopic images are overlapped and displayed on the polarization preserving screen, viewers wearing matching passive 3D glasses will benefit from the substantially brighter 3D effect of image depth. The lenses of the glasses have different polarizations for the right and left eyes so images with one polarization enter one eye and images with a different polarization enter the other eye. Subsequently, the viewers' brains can combine the images received to form a 3D image.

Figure 10:
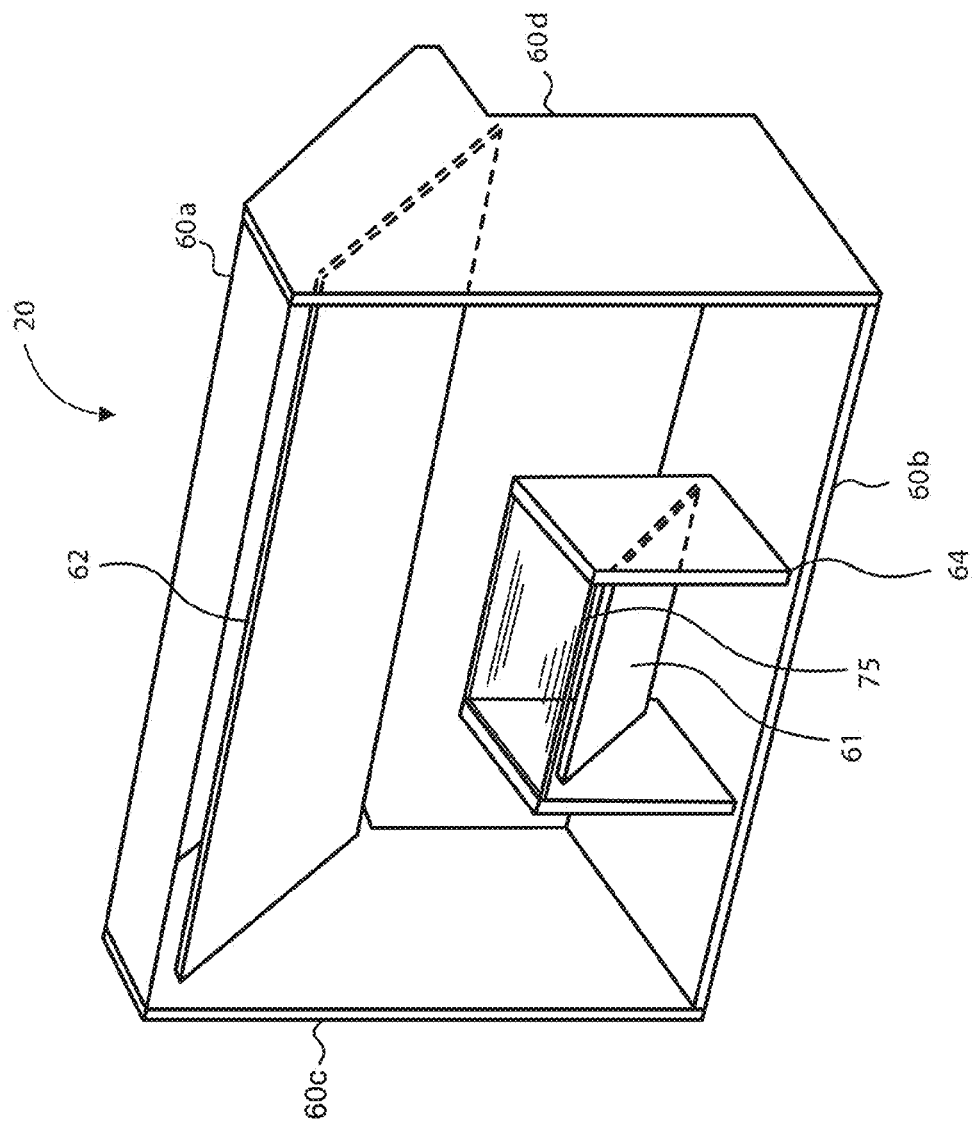
FIG. 10 is a block diagram showing the light converter of FIG. 6 with a fixed focal length lens.

Alternative embodiments of the light converter are possible. FIG. 10 is a block diagram showing the light converter of FIG. 6 with a fixed focal length lens. The fixed focal length lens 75 can be a single lens, such as a biconvex, plano-convex, plano-concave, biconcave or convex-concave simple lens, which is positioned within the chassis between the beam splitter 61 and the phase shifting optic 62. Specifically, the fixed focal length lens 75 can be horizontally positioned above the support members 64 of the beam splitter 61 and in one example, can be affixed to the top surface of the support members. In this embodiment, a single protective housing of anti-reflection coated glass or light transmissive optical material can enclose both the beam splitter and fixed focal length lens. In a further example, the fixed focal length lens can be horizontally affixed to the inner sides of the chassis, between the beam splitter and phase shifting optic and a separate protective housing can enclose the fixed focal length lens.

The difference in path length between the two beam paths generated within the light converter can cause a slight amount of defocusing in the image from one path when the image from the other path is focused sharply. Placement of the fixed focal length lens between the beam splitter and phase shifting optic can keep the original image path sharply focused and correct the slight de-focusing in the longer path through a center of the fixed focal length lens. In a further embodiment, at least two lenses could be used in combination to allow slight focus adjustments and to correct for chromatic and spherical aberrations. Alternately, the lens or lenses can be placed vertically after the phase shifting optic and affixed to the chassis (not shown) or in the case of multiple lenses split in location with at least one lens before and at least one after the phase shifting optic.

An alternate use of the single fixed focal length lens 75 can be to adjust for the slight magnification difference caused by the slightly longer path length, while ignoring the small focus difference. In addition to the magnification correction, the small amount of keystone distortion introduced in the longer path can be minimized through a small off-center shift in position of the fixed focal length lens perpendicular in one axis to the light rays passing through it. This shift can either be built into the lens shape, or the lens can be affixed to a single axis translation stage to enable user adjustment, and the single axis translation stage can be affixed to the chassis or the top surface of the beam splitter support members 64. The size of the fixed focal length lens 75 can be dependent on a total light path distance from a projector lens focal point to the fixed focal length lens and a desired minimum width/distance throw ratio for the stereoscopic recycling device.

A different fixed focal length lens may be required for different ranges of throw ratios. For instance, a particular fixed focal length lens may be used with the recycling device for a particular range of throw-ratios with respect to the projector and projection screen. A different fixed focal length lens may be used with the recycling device when a projector/screen throw-ratio relationship is located outside a valid throw-ratio range for the current fixed focal length lens 75. In one embodiment, a preformed set of fixed focal length lenses can be created and provided to a user with the light converter. Based on the distance of the projector from the screen and the size of the screen, the user can select an appropriate fixed focal length lens and insert the lens within the chassis.

Figure 11:
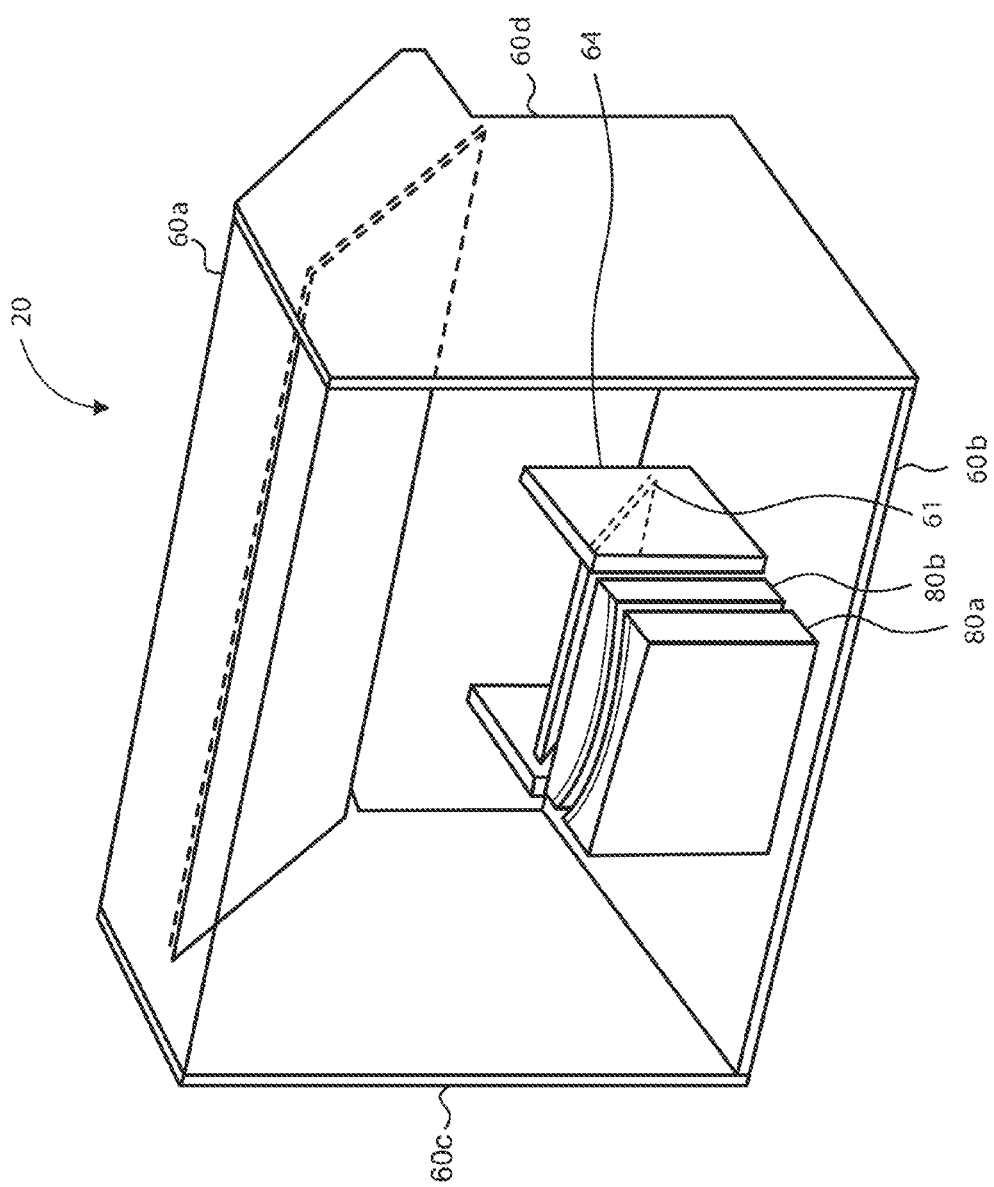
FIG. 11 is a block diagram showing the light converter of FIG. 6 with a telephoto lens pair.

In yet a further embodiment, the light converter can include a telephoto lens to correct a magnification difference of the images produced by the two light beams. FIG. 11 is a block diagram showing the light converter of FIG. 6 with a telephoto lens pair 80a-b. Each lens in the pair can include additional lenses to correct for aberrations such as chromatic and spherical aberrations. The telephoto lens pair 80a-b is positioned after the beam splitter 61, facing the front of the light converter, and can be affixed to the support members 64 or separately affixed to the chassis. The telephoto lens 80a-b can correct a magnification difference of the images from the two light beams generated by the light converter. Generally, the images of one of the paths are larger since the light beam travels a longer path than the other light beam. Placement of the telephoto lens pair 80a-b after the beam splitter 61 can increase magnification of the image from the light beam along the shorter path. Meanwhile, any keystone distortion created in the longer reflected path can be allowed to remain uncorrected, can be minimized through a small shift in position of at least one of the lenses along an axis perpendicular to the light path, or can be separately adjusted using either the adjustable or static phase shifting optic.

Figure 12:
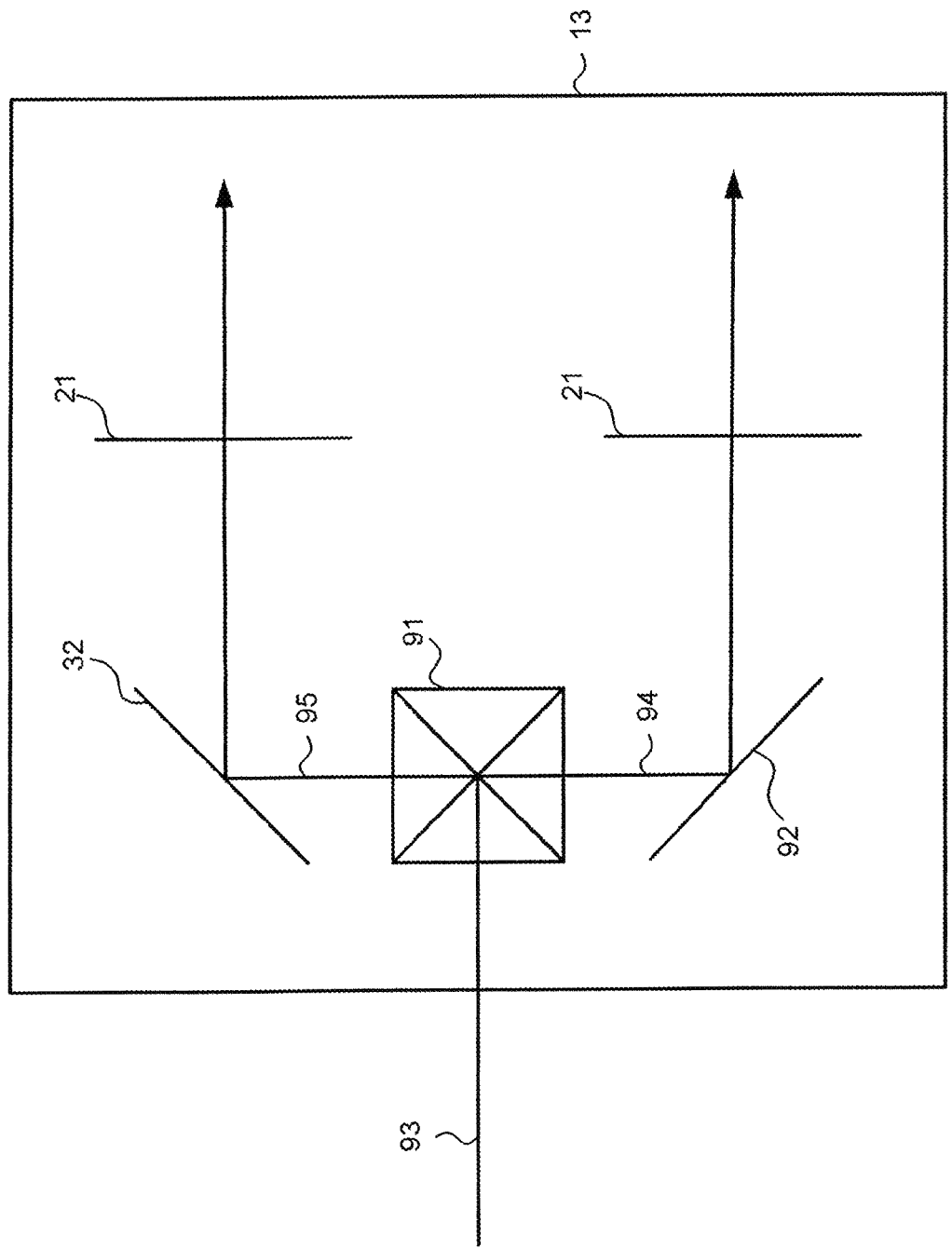
FIG. 12 is a block diagram showing light transmitted through the recycling device of FIG. 1 with a four-prism cube beam splitter.

A still further embodiment provides a light converter with a four-prism cube beam splitter. FIG. 12 is a block diagram 90 showing light 93 transmitted through the recycling device 13 of FIG. 1 with a four-prism cube beam splitter 91 to create two equal path lengths. In this embodiment, two separate substantially orthogonally polarized pathways of light 94, 95 exit the cube beam splitter in opposite directions. One path 95 is directed to the phase shifting optic 32, while the other 94 is directed to a reflector 92 located in the housing opposite the phase shifting optic. For example, referring back to the light converter of FIG. 2, the reflector 92 can be positioned below the beam splitter. The reflector can be affixed to an adjustment device which is affixed to the chassis to assist in closely aligning the images from the two light paths. The adjustment device can include a kinematic mount with 2-axis angle adjustment such as pitch and roll that allows the reflector to be steered vertically and horizontally, and can further include z-axis translation. Use of the four-prism cube beam splitter creates no magnification or focus difference, thus requires no magnification or focus correction. Keystone distortion is still introduced and can be corrected using either the adjustable or static phase shifting optic, or allowed to remain uncorrected.

A further embodiment provides a recycling device with a dual beam splitter. FIG. 13 is a block image showing the light transmitted through the recycling device 13 of FIG. 1 with two beam splitters 101, 102 and two phase shifting optics 32. A dual beam splitter is positioned within the light converter of the recycling device and includes the two beam splitters 101, 102 that are arranged to form an angle. The vertex of the angle faces the projector, while an input side of each beam splitter also faces the projector. Phase shifting optics 32 are located on opposite sides of the dual beam splitter 101, 102.

The projector emits a beam of partially polarized light towards the dual beam splitters 32, which split the light beam into three separate paths. One path includes p-polarized light that travels along the path of the original light beam and passes through the dual beam splitter to a polarizing modulator 21. The polarizing modulator 21 converts the p-polarized light to alternating handedness of circular light in sync with the projected left and right images, which is projected upon the projection screen and a stereoscopic image is displayed.

Meanwhile, light is directed away from each of the beam splitters 101, 102 in opposite directions as s-polarized light. Specifically, the s-polarized light is directed towards the respective phase shifting optic 32, which receives the s-polarized light, converts the s-polarized light to p-polarized light, and reflects the converted p-polarized light along a path that is nearly parallel to the p-polarized light that passes through the beam splitter. The converted p-polarized light is transmitted through the polarizing modulator 21, which converts the converted p-polarized light path to alternating handedness of circular light in sync with the projected left and right images. The circular light is projected on the screen where a further stereoscopic image is displayed in relation to the stereoscopic image of the original p-polarized light path.

Figure 14A:
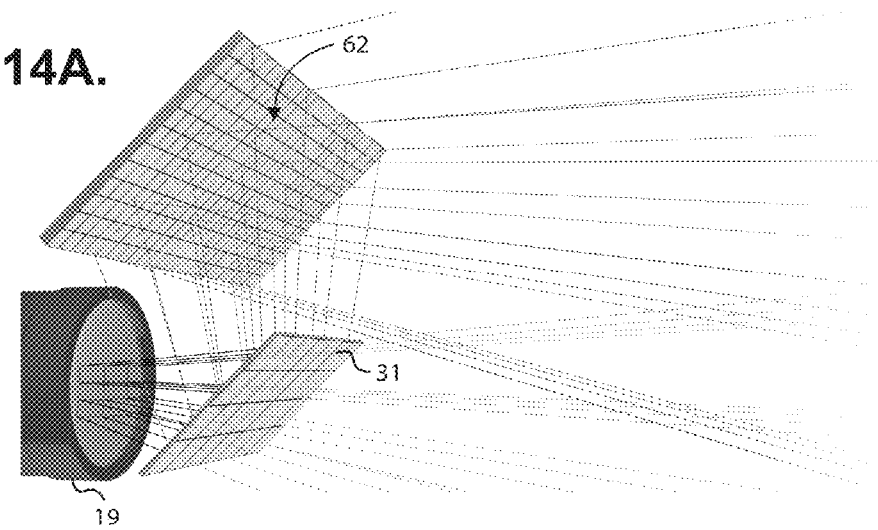
FIG. 14A is a ray trace showing, in one example, light reflected away from the static phase shifting optic of FIG. 6 and illustrating a uniform surface shape.
Figure 14B:
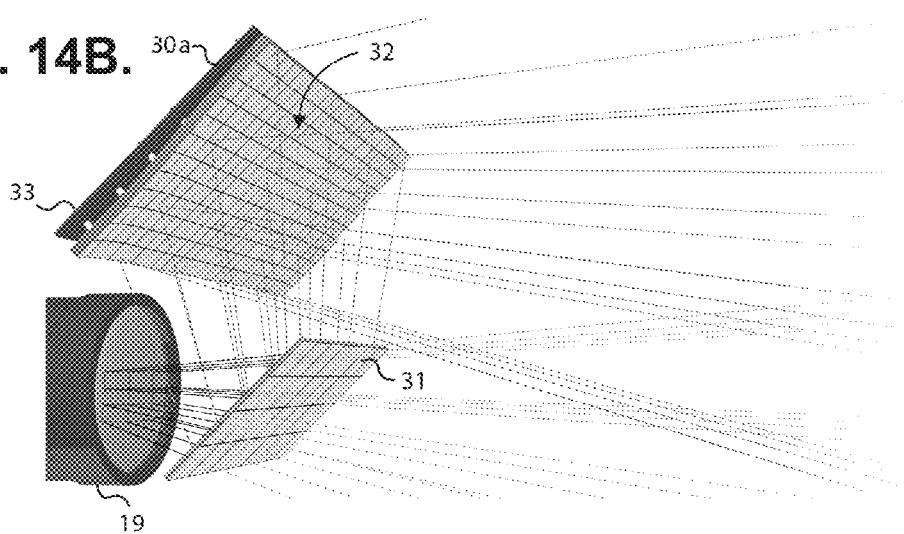
FIG. 14B is a ray trace showing, in one example, light reflected away from the adjustable phase shifting optic of FIG. 2 adjusted to create a non-uniform surface shape.
Figure 14C:
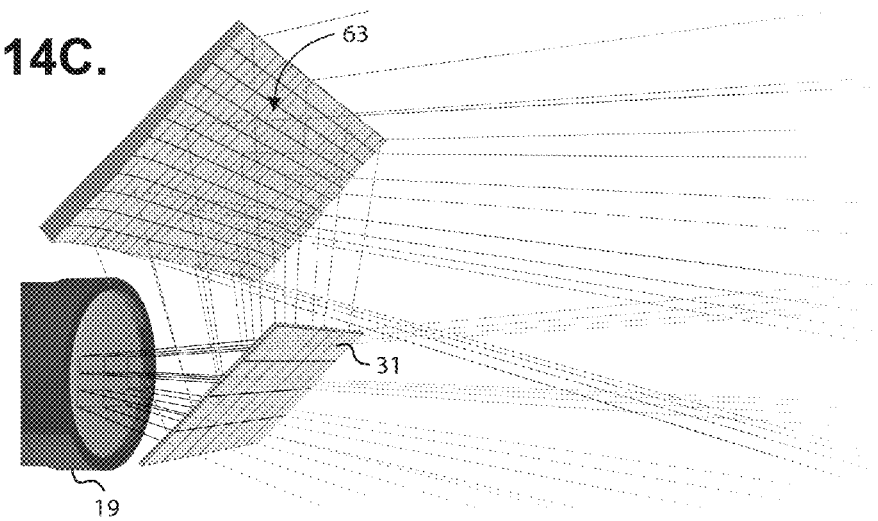
FIG. 14C is a ray trace showing, in one example, light reflected away from the static phase shifting optic of FIG. 6 and illustrating a non-uniform surface shape.

A surface of the phase shifting optic can have a uniform or non-uniform shape which can depend on the intended type and amount of image correction to be created by the phase shifting optic in order to achieve substantial image overlap at the screen. FIG. 14A is a ray trace showing, in one example, the light reflected away from the static phase shifting optic 62 of FIG. 6 having a uniform flat shape, while FIG. 14B is a ray trace showing, in one example, the light reflected away from the adjustable phase shifting optic 32 of FIG. 2, with an exaggerated adjustment to illustrate a type of non-uniform surface shape possible. FIG. 14C is a ray trace showing, in one example, the light reflected away from a static phase shifting optic 63 but with an exaggerated pre-formed non-uniform surface shape.

While the invention has been particularly shown and described as referenced to the embodiments thereof, those skilled in the art will understand that the foregoing and other changes in form and detail may be made therein without departing from the spirit and scope of the invention.

What is claimed is:

1. A method for constructing a stereoscopic device for recapturing light, comprising:
    constructing a chassis comprising front and back openings, the back opening open to divergent image light, and that forms a housing that frames the front and back openings;
    facing a beam splitter constructed of substantially orthogonally polarizing material to the back opening, wherein the beam splitter is captively held to the chassis;
    placing at an angle non-perpendicular to the divergent image light a single phase shifting optic comprising a reflective surface coated by a phase shifting film on which the divergent image light is received, such that the phase shifting optic is facing toward the front opening and substantially parallel to the polarizing material of the beam splitter, wherein the beam splitter and phase shifting optic are in optical alignment with each other within the chassis; and
    positioning in front of the front opening a modulator sized to cover at least a portion of the front opening.

2. A method according to claim 1, wherein the chassis is positioned in front of a digital projector such that an input side of the beam splitter faces a lens of the projector.

3. A method according to claim 1, wherein the reflective surface of the phase shifting optic comprises a free-form mirror.

4. A method according to claim 1, wherein the reflective surface of the phase shifting optic comprises an adjustable mirror.

5. A method according to claim 1, wherein the phase shifting film of the phase shifting optic comprises quarter wave retarder film.

6. A method according to claim 1, wherein the phase shifting film of the phase shifting optic is affixed to the reflective surface via at least one of optical adhesive and direct coating.

7. A method according to claim 1, further comprising at least one of:
    affixing to the chassis a static support structure configured to support the beam splitter at a fixed angle; and
    affixing to the chassis an adjustable support structure configured to support the beam splitter at adjustable angles.

8. A method according to claim 1, wherein the phase shifting optic is affixed to the chassis via one of the top side and the two sides.

9. A method according to claim 1, further comprising:
    affixing to the chassis an adjustment device configured to support the phase shifting optic at adjustable angles.

10. A method according to claim 1, further comprising:
    providing a further phase shifting optic that is interchangeable with the phase shifting optic.

11. A method according to claim 1, further comprising at least one of:
    positioning a fixed-focus lens between the beam splitter and the phase shifting optic; and
    positioning a fixed-focus lens after the beam splitter and the phase shifting optic.

12. A method according to claim 1, further comprising at least one of:
    positioning a plurality of lenses in a light path between the beam splitter and the modulator; and
    positioning a plurality of lenses in a light path after the beam splitter and the modulator.

13. A method according to claim 1, further comprising:
    positioning a further modulator to separately receive light from one of the beam splitter and the phase shifting optic.

14. A method according to claim 1, wherein the beam splitter is at least one of a wire grid polarizer, a two-prism polarizing cube beam splitter, and a four-prism polarizing X prism cube beam splitter.

15. A method according to claim 1, further comprising:
    positioning a reflector opposite the phase shifting optic in relation to the beam splitter and angled toward the front opening, wherein the reflector and the beam splitter are in optical alignment with each other within the chassis.

16. A method according to claim 15, further comprising:
    affixing an adjustment device to the chassis and configured to support the reflector at adjustable angles.

17. A method according to claim 1, further comprising:
affixing a further beam splitter at an angle to the beam splitter as a dual beam splitter.

18. A method according to claim 1, further comprising:
separately enclosing at least one of the beam splitter and the phase shifting optic in a protective housing.

19. A method according to claim 1, further comprising:
covering the back opening of the chassis with a back panel; and
forming a window within the back panel.

20. A method according to claim 19, further comprising:
covering the window in the back panel with a substantially non-reflective light transmissive material.

21. A method according to claim 11, further comprising:
providing a further fixed-focus lens that is interchangeable with the fixed-focus lens.

22. A method according to claim 11, further comprising:
affixing an adjustment device to one of the beam splitter support and the chassis, wherein the adjustment device is configured to support and translate the fixed-focus lens along a single axis.

* * * * *